United States Patent [19]
Jokic

[11] Patent Number: 5,906,275
[45] Date of Patent: May 25, 1999

[54] STORAGE UNIT FOR COMPACT DISK

[76] Inventor: Zoran Jokic, 699 Carroll Pl., Teaneck, N.J. 07666

[21] Appl. No.: 09/032,831

[22] Filed: Mar. 2, 1998

[51] Int. Cl.⁶ .................................................. B65D 85/57
[52] U.S. Cl. ..................... 206/308.1; 206/310; 206/312
[58] Field of Search ............................... 206/232, 308.1, 206/309, 310, 311, 312, 313

[56] References Cited

U.S. PATENT DOCUMENTS

| | | | |
|---|---|---|---|
| 5,573,120 | 11/1996 | Kaufman et al. ..................... | 206/308.1 |
| 5,697,499 | 12/1997 | Reiter ................................... | 206/308.1 |

*Primary Examiner*—Jacob K. Ackun

*Attorney, Agent, or Firm*—Charles E. Baxley, Esq.

[57] ABSTRACT

The present invention teaches a container for compact disks includes a base portion and an integrally formed support portion which is connected to the base portion by a flexure hinge. The support panel includes a compact disk holder which facilitates mounting a compact disk on the support panel. The flexure hinge allows the support panel to pivot from a first position in which the support panel and the compact disk are located in a recess, formed in the base portion, to a second position in which the support panel and the compact disk are pivoted away from the base portion. A cover is attached tot he support panel at a location close to the hinge. Opening the cover causes the support panel to rotate from the first position to the second position thereby facilitating installation or removal of a compact disk.

18 Claims, 4 Drawing Sheets

STORAGE UNIT FOR COMPACT DISK

BACKGROUND OF THE INVENTION

1. Field of the Invention

The present invention relates generally to containers and, more particularly, to a storage unit for compact disks which features ease of use.

2. Prior Art

The prior art related to containers or storage units for compact disks includes the well-known type of container known as a jewel box. This container typically is formed as a clear plastic box with an internal platform. The platform includes a hub portion with spring fingers which closely fit the center hole of a compact disk. This type of container typically has a snap-fit lid which is both difficult and time consuming to open. Typically two hands are needed to pry open the lid. Once the lid is opened, the user must grasp the rim of the compact disk which rests close to the platform and pry the compact disk away from the hub. During this process the compact disk usually bends and the user often becomes concerned that excessive force may be applied to the compact disk.

To install a compact disk into a conventional jewel box the lid must again be pried open and the compact disk must be pushed onto the hub. This process again bends the compact disk and the handling process leaves often finger prints and minute particles of dirt which are inadvertently transferred from the user's hands.

The conventional jewel box container is especially difficult and frustrating for children and older persons who lack the manual dexterity required to perform the required actions needed to remove and replace a compact disk in an efficient manner.

The conventional jewel box container requires a separate printed paper or cardstock package insert in order to present graphic and text information regarding the compact disk stored therein.

Additionally, the covers of conventional jewel box containers include a relatively thin plastic panel, which is subject to cracking and breakage.

The prior art related to compact disks includes the following U.S. Pat. Nos. 4,793,480, 5,168,991, 5,244,084, 5,421,452, 5,246,107, 5,450,953 and 5,462,160.

U.S. Pat. No. 4,793,480 to Gelardi et al shows a storage container which is formed by two pivotally connected panels and a holder which automatically moves to an intermediate position when the two panels are separated.

U.S. Pat. No. 5,168,991 to Whitehead et al shows a storage container which is formed by two pivotally connected panels and a holder which can slide to a position between the panels when the two panels are opened and are in-line.

U.S. Pat. No. 5,244,084 to Chan shows a case which is formed by two outer shells which are connected to hold a disk holder. The disk holder can be turned out of the shells and then turned into the shells. A wedge block on one of the shells is engaged into an opening in the disk holder to lock the disk holder into the shells.

U.S. Pat. No. 5,421,452 to Hybiske shows a case which includes a pocket section into which a tray section, which holds a disk, is slideably mounted. The tray and the pocket section are fabricated from a single sheet of cardboard and a plurality of plates which hold a compact disk. The plates are connected by hinges to form an accordion-like structure.

U.S. Pat. No. 5,450,953 to Reisman shows a package which includes a rectangular envelope which contains a slideable carrier sheet which holds a compact disk. The carrier sheet includes a tab which extends into a slit in the envelope to restrict motion so that the carrier sheet is only partially removable from the envelope.

U.S. Pat. No. 5,462,160 to Youngs shows a storage container which includes a flexible sheet which is cut to form a flap which holds a compact disk. The container is formed of flexible sheets which may have holes punched to create a booklet of storage containers.

Despite the developments of the prior art, there remains a need for a storage unit for compact disks which is easy to use, easy to imprint and relatively rugged.

OBJECTS AND SUMMARY OF THE INVENTION

It is an object of the present invention to provide a storage unit for compact disks which is extremely easy to use by a broad range of persons having varying degrees of manual dexterity.

Another object of the present invention is to provide a storage unit for compact disks from which it is extremely easy to remove a compact disk.

Another object of the present invention is to provide a storage unit for compact disks which easily opens and by a pop-up action automatically presents the compact disk to a user.

Another object of the present invention is to provide a storage unit for compact disks which can be easily imprinted without a need for a separate paper insert.

Another object of the present invention is to provide a storage unit for compact disks which meets industry size standards and which is compatible with current industry requirements for graphic information.

Yet another object of the present invention is to provide a storage unit for compact disks which is composed of a small number of component parts which can be economically manufactured in quantity, resulting in a relatively low unit cost.

The foregoing and other objects and advantages of the present invention will appear more clearly hereinafter.

In accordance with the present invention there is provided a storage unit for compact disks which includes a base portion which is connected to a support panel by a flexure hinge. An outer portion of the support panel has a compact disk holder which includes a hub of flexible fingers.

The flexure hinge is capable of pivoting the support panel from a first position in which the support panel and a compact disk, mounted on the compact disk holder, are located in a recess which is formed in the base portion to a second position in which the support panel and the compact disk are pivoted away from the base portion.

A cover is provided which is attached to an intermediate portion of the support panel which is located relatively close to the flexure hinge. Opening the cover causes the support panel to pivot from the first position to the second position and facilitates easy insertion or removal of a compact disk from the compact disk holder. The cover includes an end panel and a bottom panel which covers the bottom of the base portion. The cover is preferably made of paperboard and is printed with appropriate indicia describing the contents of the compact disk which is stored in the storage unit.

DESCRIPTION OF THE DRAWINGS

Other important objects and advantages of the present invention will be apparent from the following detailed

Figure 1:
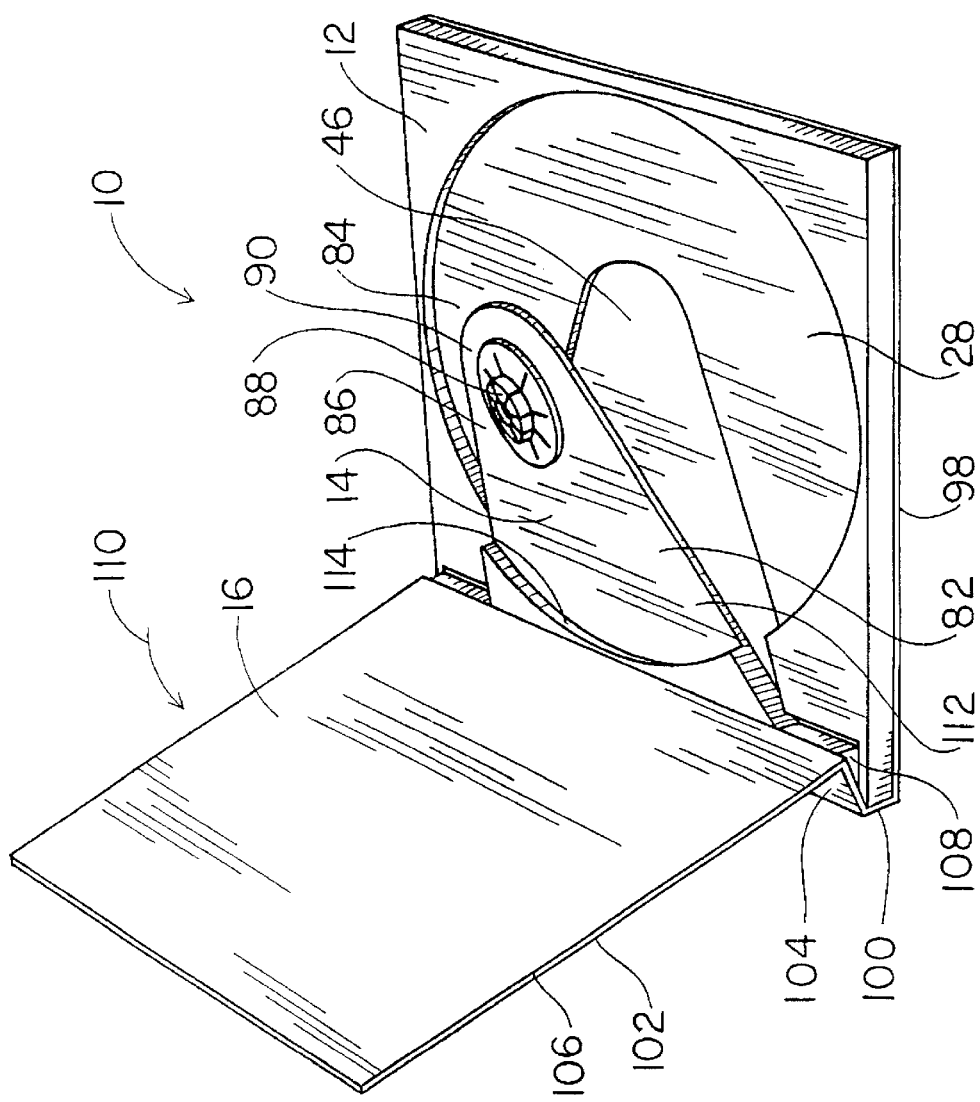
Figure 2:
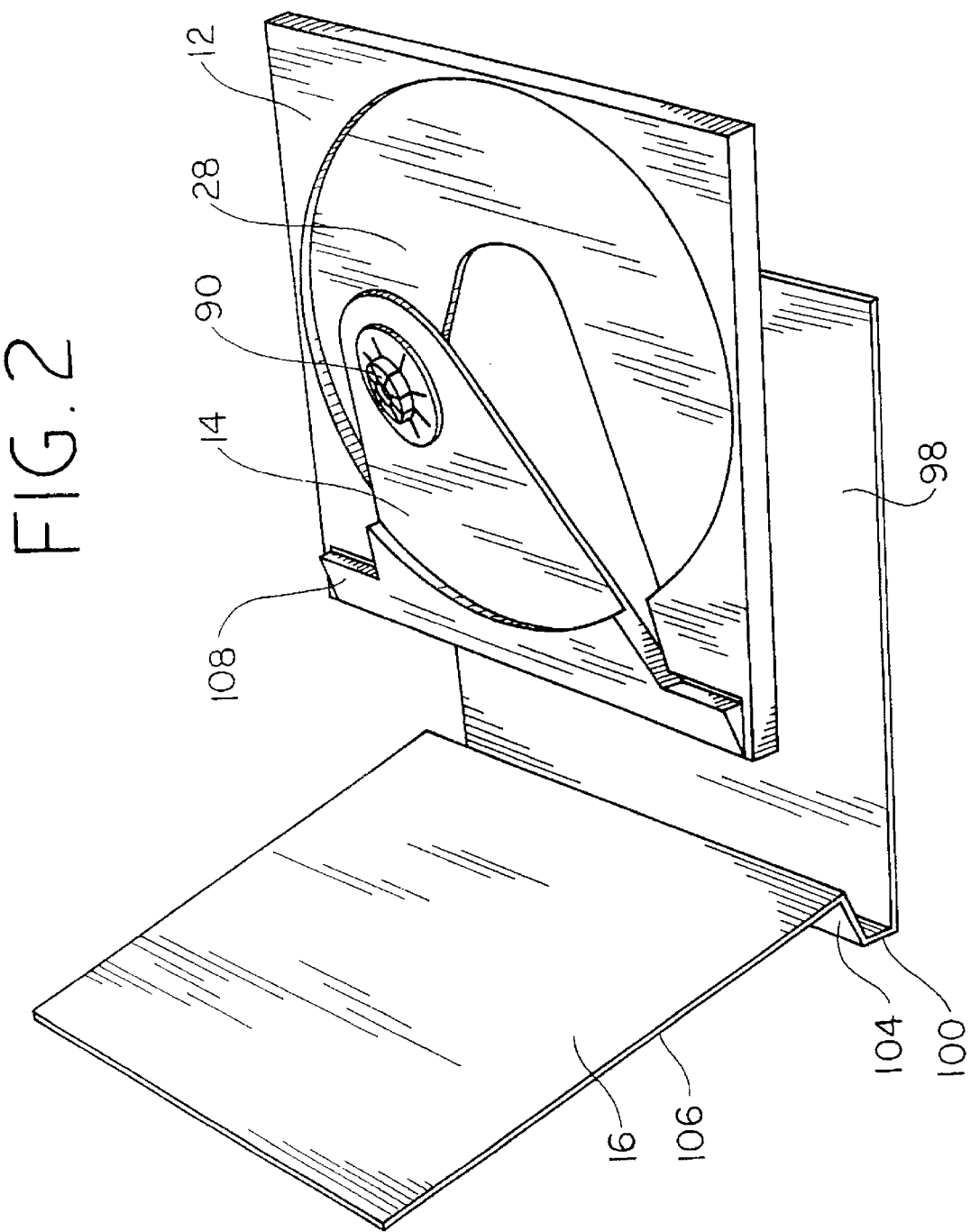
Figure 3:
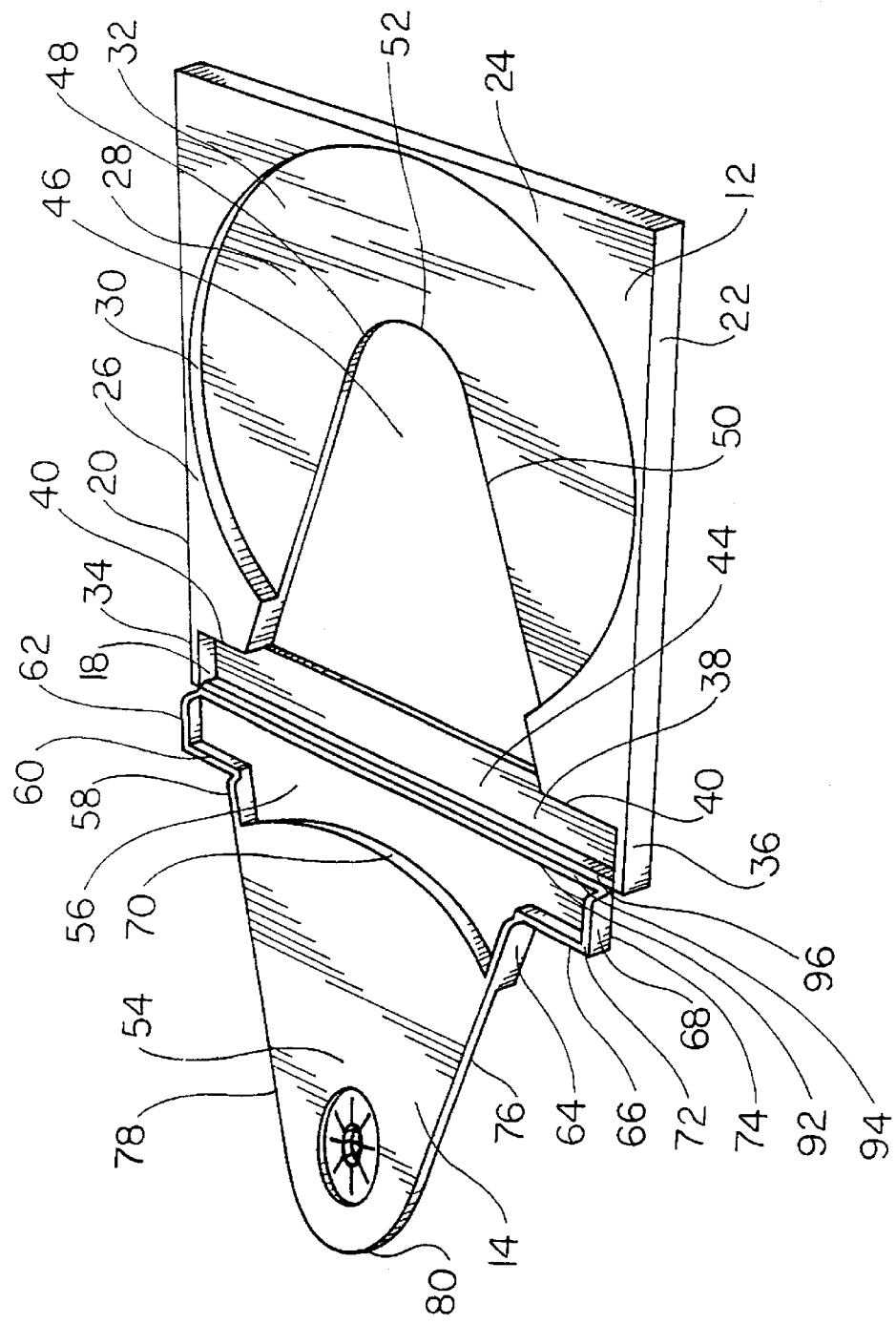
Figure 4:
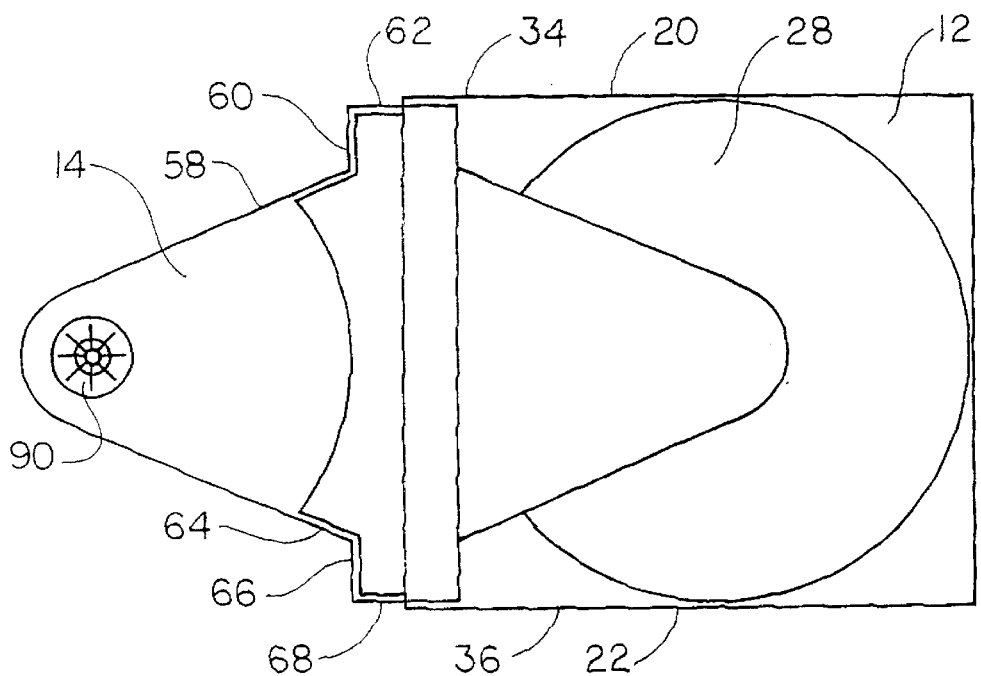
Figure 5:
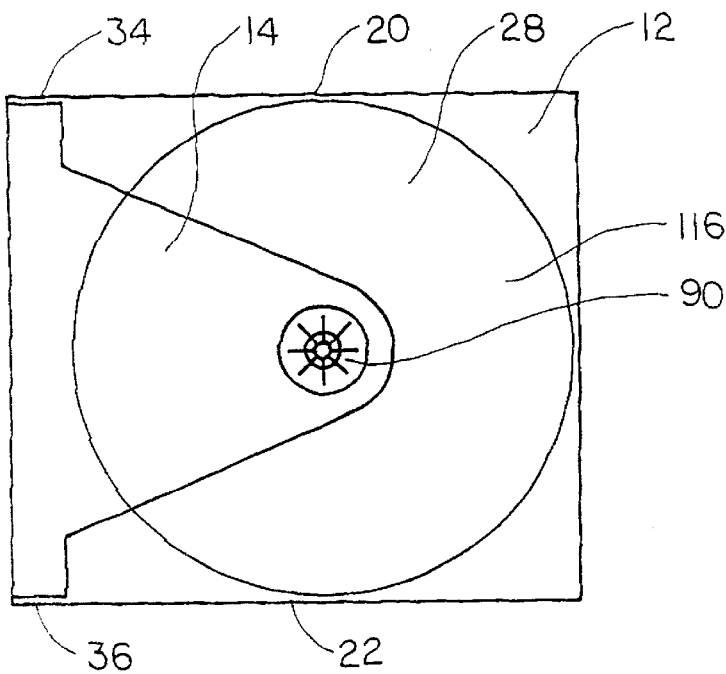

3 description taken in connection with the accompanying drawings in which:

FIG. 1 is an overall perspective view of a storage unit for compact disks showing the unit open;

FIG. 2 is an exploded view of the storage unit of FIG. 1;

FIG. 3 is a perspective view of the base of the storage unit of FIG. 1;

FIG. 4 is a top plan view of the base of the storage unit of FIG. 1 showing the compact disk support panel in the open position; and FIG. 5 is a top plan view of the base of the storage unit of FIG. 1 showing the compact disk support panel in the closed position.

DETAILED DESCRIPTION OF THE INVENTION

With reference to the drawings, wherein like reference numbers designate like or corresponding parts throughout, there is shown in FIGS. 1–5 a storage unit for compact disks 10 made in accordance with the present invention, which includes a base 12, a compact disk support panel 14 and a cover 16.

The base 12 is formed as a unitary member which has four side walls 18, 20, 22, 24 and a panel portion 26. Panel portion 26 has a centrally located recessed portion 28 which is nearly circular, as is best shown in FIG. 3, and which has a diameter which is proportioned to accept a compact disk. Recessed portion 28 is defined by a curved wall portion 30 and a bottom portion 32.

Side wall 18, portions 34, 36 of side walls 20, 22, bottom panel 38 and wall portions 40, 42 define a generally rectangular recess 44 formed in base 12 which cooperates with the compact disk support panel 14 in a manner which will be presently described.

A central portion of the recessed portion 28 is cut away, forming an aperture 46 which is proportioned to accept the compact disk support panel 14 when the compact disk support panel 14 is in the closed position. Edges 48, 50 of aperture 46 converge and are joined by a circular portion 52.

Compact disk support panel 14 is formed as a unitary member which includes panels 54, 56, side walls 58, 60, 62, 64, 66, 68 and a curved wall portion 70. When viewed in the open position, as is shown in FIG. 3, panel 54 is formed at the upper edge 72 of side walls 58, 64 while support panel 56 is formed at the lower edge 74 of side walls 58, 60, 62, 64, 66, 68. As is best shown in FIGS. 1 and 3, when the compact disk container 10 is closed, side walls 58, 60, 62, 64, 66, 68 fit within side walls 18, 20, 22.

Support panel 14 has converging edges 76, 78 which are joined by a circular portion 80. In the closed position, panel 54 fits into the aperture 46 and the surface 82 of the support panel 14 and the surface 84 of the recess portion 28 form a generally co-planar surface. Outer portion 86 of panel 14 includes a plurality of flexible fingers 88 which form a compact disk holding hub 90. The holding hub 90, which is conventional in configuration, engages and holds a compact disk, in a known manner, which is not shown for purposes of clarity of illustration.

Support panel 14 and base 12 are preferably formed as a unitary member with edge 92 of panel 56 joined to the upper edge 94 of side wall 18 on the base 12 by a flexure hinge 96 formed by an area of reduced thickness. Hinge 96 is of the type which is generally known as a living hinge.

As is best shown in FIGS. 1 and 2, cover 16 is formed of sheet material such as paperboard or plastic and includes:

4 bottom panel 98, side panel 100 and top panel 102 which is hinged to form a first portion 104 and a second portion 106. As is shown in FIG. 1, the first portion 104 of cover 16 is glued to the top portion 108 of support panel 14. When cover 16 is opened by rotation in the direction shown by arrow 110 in FIG. 1, support panel 14 pivots away from base 12 and thus pops up and presents a compact disk which has been mounted on the holding hub 90 in a convenient manner. The bottom panel 98 of cover 16 may be glued to the bottom of the recessed portion 28, thereby providing a closed container 10 for effective protection of a compact disk stored within. Base portion 12 and support panel 14 are preferably made of a moldable plastic, while cover 16 may be made of paperboard or sheet plastic. Cover 16 may be imprinted with descriptive graphics related to the compact disk stored within the storage unit 10.

As is best shown in FIGS. 1, 2 and 5, support panel 14 includes a step portion 112 which is defined by curved wall 114. When the storage unit 10 is closed, the support panel 14 pivots into aperture 46 and curved wall 30 and curved wall 114 combine to define a circular recess 116, best shown in FIG. 5, which can accept and protect a compact disk which may be mounted on hub 90.

The foregoing specific embodiments of the present invention as set forth in the specification herein are for illustrative purposes only. Various deviations and modifications can be made within the spirit and scope of this invention, without departing from the main theme thereof.

I claim:

1. A storage unit for compact disks comprising:

a base portion;

support panel means, having a first portion, a second portion and an intermediate portion;

hinge connection means connecting said base portion and said first portion of said support panel means with said base portion and said support panel means forming a unitary structure;

compact disk holding means integrally formed on said second portion of said support panel means;

with said hinge connection means capable of pivoting said support panel means to a first position with said second portion of said support panel means proximate said base portion and a second position with said second portion of said support panel means relatively distant from said base portion;

cover means, with said cover means comprising a cover panel;

attachment means for attachment of said cover panel and said intermediate portion of said support panel means disposed proximate said hinge means, whereby lifting said cover panel away from said base portion causes said support panel to rotate from said first position to said second position.

2. The storage unit for compact disks as claimed in claim 1, wherein said base portion comprises:

a recess portion, with said recess portion proportioned to accept said support panel means when said support panel means is in said first position.

3. The storage unit for compact disks as claimed in claim 2, wherein said recess portion is proportioned to accept said support panel means in a position generally co-planar with said base portion.

4. The storage unit for compact disks as claimed in claim 2, wherein said recess portion is proportioned to accept both said support panel means and a compact disk mounted on said compact disk holding means.

5. The storage unit for compact disks as claimed in claim 2, wherein said recess portion is near-circular in configuration.

6. The storage unit for compact disks as claimed in claim 1, wherein said cover means further comprises:

an end panel, with said end panel pivotally connected to said cover panel; and a bottom panel connected to said end panel and connected to said base portion.

7. The storage unit for compact disks as claimed in claim 1, wherein said attachment means for attachment of said cover panel and said intermediate portion of said support panel comprises an adhesive layer.

8. The storage unit for compact disks as claimed in claim 1, wherein said base portion and said support panel are made of plastic.

9. The storage unit for compact disks as claimed in claim 1, wherein said cover portion is made of paperboard.

10. The storage unit for compact disks as claimed in claim 1, wherein said cover portion is made of plastic.

11. The storage unit for compact disks as claimed in claim 1, wherein said support panel has a tapered configuration with a relatively wider portion and a relatively narrower portion with said relatively wider portion proximate said hinge connection means and said relatively narrower portion proximate said compact disk support means.

12. The storage unit for compact disks as claimed in claim 1, wherein said compact disk support means comprises a plurality of flexible support fingers.

13. The storage unit for compact disks as claimed in claim 1, wherein said base portion comprises:

a base panel portion having four edges, an upper surface and a lower surface, and four side wall portions integrally formed, one each, at each of said edges of said base panel portion.

14. The storage unit for compact disks as claimed in claim 13, wherein said bottom panel of said cover means covers said lower surface of said base portion.

15. The storage unit for compact disks as claimed in claim 1, wherein said cover panel has an inner surface disposed facing said support panel means and an outer surface disposed facing away from said support panel means with indicia formed on said outer surface of said cover panel.

16. The storage unit for compact disks as claimed in claim 1, wherein said hinge connection means comprises flexure hinge means.

17. The storage unit for compact disks as claimed in claim 1, wherein said hinge connection means is formed by a portion of reduced thickness joining said base portion and said support panel means.

18. A storage unit for compact disks comprising:

a base portion;

support panel means with said support panel means having a first portion, a second portion and an intermediate portion;

hinge connection means connecting said base portion and said first portion of said support panel means;

compact disk holding means integrally formed on said support panel means;

with said hinge connection means capable of pivoting said support panel means to a first position, with said second portion of said support panel means proximate said base portion and a second position with said second portion of said support panel means relatively distant from said base portion;

cover means, with said cover means comprising a cover panel;

attachment means for attachment of said cover panel and said intermediate portion of said support panel proximate said hinge means, whereby lifting said cover panel away from said base portion causes said support panel to rotate from said first position to said second position.

\* \* \* \* \*